US012272038B2

United States Patent
Song et al.

(10) Patent No.: US 12,272,038 B2
(45) Date of Patent: Apr. 8, 2025

(54) APPARATUS AND METHOD FOR REAR VIEW CAMERA IMAGE PROCESSING

(71) Applicant: TELECHIPS INC., Gyeonggi-do (KR)

(72) Inventors: Inseok Soo Song, Seoul (KR); Yujeong Kim, Seoul (KR)

(73) Assignee: TELECHIPS INC., Seongnam-si (KR)

( * ) Notice: Subject to any disclaimer, the term of this patent is extended or adjusted under 35 U.S.C. 154(b) by 1 day.

(21) Appl. No.: 18/255,597

(22) PCT Filed: Nov. 22, 2021

(86) PCT No.: PCT/KR2021/017185
§ 371 (c)(1),
(2) Date: Jun. 2, 2023

(87) PCT Pub. No.: WO2022/119205
PCT Pub. Date: Jun. 9, 2022

(65) Prior Publication Data
US 2023/0385996 A1    Nov. 30, 2023

(30) Foreign Application Priority Data

Dec. 2, 2020  (KR) .......................... 10-2020-0167005
Jun. 3, 2021  (KR) .......................... 10-2021-0071970

(51) Int. Cl.
*G06T 5/80*    (2024.01)
*G06T 3/40*    (2006.01)

(52) U.S. Cl.
CPC . *G06T 5/80* (2024.01); *G06T 3/40* (2013.01)

(58) Field of Classification Search
None
See application file for complete search history.

(56) References Cited

U.S. PATENT DOCUMENTS

2009/0262231 A1*  10/2009  Murata ................. G06T 5/80
                                              348/335
2013/0027558 A1*  1/2013  Ramanath .............. G06T 3/047
                                              348/148

(Continued)

FOREIGN PATENT DOCUMENTS

DE    102012223373 A1    1/2014
JP    2008-167062 A     7/2008

(Continued)

OTHER PUBLICATIONS

PCT/KR2021/017185 Search Report and Written Opinion issued on Feb. 23, 2022.

*Primary Examiner* — Eileen M Adams (57) ABSTRACT

Disclosed is a method for processing, by a rear view camera image processing apparatus operated by at least one processor, an original rear image collected by a rear view camera, in which when the rear view camera collects an original rear image, the original rear image is processed through each of a first path and a second path, and an output image generated through the first path is displayed to a display apparatus, and a reduced rear image generated through the second path is temporarily stored.
The effectiveness of the output image generated through the first path is judged, and when the output image is not effective, the temporarily stored reduced rear image is generated as a rear output image and delivered to the display apparatus.

10 Claims, 5 Drawing Sheets

(56) References Cited

U.S. PATENT DOCUMENTS

2017/0246991 A1\* 8/2017 Harter .................. H04N 23/634
2020/0090530 A1  3/2020 Zhang et al.
2023/0023434 A1\* 1/2023 Nowicka ................ G06V 20/00

FOREIGN PATENT DOCUMENTS

| JP | 2009-064427 A | 3/2009 |
| JP | 4984974 B | 7/2012 |
| JP | 2012199877 A | 10/2012 |
| JP | 2014179959 A | 9/2014 |
| KR | 10-2009-0021627 A | 3/2009 |
| KR | 10-1825343 B | 2/2018 |

\* cited by examiner

APPARATUS AND METHOD FOR REAR VIEW CAMERA IMAGE PROCESSING

TECHNICAL FIELD

The present disclosure relates to an apparatus and a method for rear view camera image processing, and particularly, to technology for a system and an image processing method for safely correcting distortion of an image collected by a rear view camera by applying a safety mechanism to a distortion correction function in order to support a vehicular safety rear view camera (S-RVC) function.

BACKGROUND ART

A rear view camera (RVC) shows a surrounding situation of a vehicle in the rear of the vehicle to a driver with an image to support the driver to safely reverse or park the vehicle. Due to the importance, a safety mechanism should be particularly applied to components that process an image collected by the rear view camera. The safety mechanism is defined in the ISO 26262 guideline which is an automotive function safety standard, and upon a unit test and an integrated test of vehicular software, or a hardware test, the safety mechanism should be normally operated.

The safety mechanism applied to the rear view camera is also referred to as effectiveness confirmation of data. In addition, a safety mechanism function should be applied to the components that process the image collected by the rear view camera.

Currently, in the rear view camera, the safety mechanism is applied to an image signal processor (ISP), a dewarp, an S-RVC, and an open low-voltage differential signaling display interface (LDI). However, the safety mechanism is not applied to a main bus through which an image or a signal is transmitted and received, and a DRAM storing the image collected by the rear view camera.

In order to apply the safety mechanism, it is general to add an end-to-end error correction code function to the main bus. In this case, the safety mechanism should be applied to all of another direct memory access (DMA) or sub system connected to the main bus. Therefore, there is difficulty in that functions for applying the safety mechanism to a chip that processes the image collected by the rear view camera should be inserted.

Further, in the case of the DRAM, by providing an error correction code bit (ECC-bit) upon reading/writing data, the effectiveness of the data should be judged. However, since it is difficult to apply the safety mechanism to the main bus, a big effect cannot be obtained in judging the data effectiveness to add the function only to the DRAM.

Therefore, when a problem occurs in the main bus or another component, the effectiveness for the data of the DRAM used in the rear view camera cannot be guaranteed. Consequently, a problem occurs in that the safety mechanism function for all signal paths is not satisfied.

A method that transforms a frame memory to be used by the rear view camera due to such a problem is also researched. However, since a capacity of an SRAM should be approximately 12 MB in order to store an image having a resolution of 2048×1440 collected by the rear view camera, a problem occurs in that a chip size increases.

DISCLOSURE

Technical Problem

The present disclosure attempts to provide an apparatus and a method for rear view camera image processing, which are capable of safely providing an image collected by a rear view camera to a driver by a safety mechanism even though a problem occurs on a main path of processing the image collected by the rear view camera by applying the safety mechanism to a dewarp function.

Technical Solution

In order to achieve a technical object of the present disclosure, an exemplary embodiment of the present disclosure provides a rear view camera image processing apparatus which includes: an image signal processor that creates an original rear image collected by a rear view camera to create a rear image; a first processing unit that corrects a distortion phenomenon of the rear image to generate a distortion correction image, and generates as an output image displayable through a display apparatus; and a second processing unit that reduces a resolution of the rear image to generated a reduced rear image and temporarily stores the reduced rear image, and upon receiving an operation control signal, corrects the distortion phenomenon of the temporarily stored reduced rear image, and then recovers the resolution to the resolution of the rear image, and generates an output rear image; and an image addition processing unit that delivers the output image generated by the first processing unit to the display apparatus, and judges the effectiveness of the output image based on a setting signal transmitted from the outside upon an initial operation, and generates the operation control signal so as for the second processing unit to operate when the output image is not effective.

The first processing unit may include a non-safety area dewarp that corrects the distortion phenomenon of the rear image and generates the distortion correction image, a memory to stores the distortion correction image, and a display controller receiving the distortion correction image stored in the memory, and converting the received distortion correction image into the output image displayable through the display apparatus.

The first processing unit may further include an open LDI receiving any one image of the output image or the output rear image from the image addition processing unit, and delivering the received image to the display apparatus.

The display controller may transmit the output image to any one of the image addition processing unit or the open LDI based on gear state information received from the outside.

The second processing unit may include a first resolution control unit receiving the rear image, and reducing the resolution of the rear image and generating the rear image as the reduced rear image, an internal memory temporarily storing the reduced rear image, a safety area dewarp receiving the reduced rear image temporarily stored in the internal memory and correcting the distortion phenomenon, and generating the reduced correction image when receiving the operation control signal, and a second resolution control unit recovering the resolution of the reduced correction image to the resolution of the rear image, and generating the rear image as the output rear image.

The image addition processing unit may receive the output image and image information from the first processing unit, and compare the setting signal and the image information to judge the effectiveness of the output image.

The setting signal may include an operation clock, and a horizontal sync signal and a vertical sync signal of an image, and the image information may include horizontal sync information and vertical sync information of the output image.

In order to achieve a technical object of the present disclosure, another exemplary embodiment of the present disclosure provides a rear view camera image processing method for processing, by a rear view camera image processing apparatus operated by at least one processor, an original rear image collected by a rear view camera, which includes: processing the original rear image through each of a first path and a second path when the rear view camera collects the original rear image; delivering an output image generated through the first path to a display apparatus, and temporarily storing a reduced correction image generated through the second path; judging the effectiveness of the output image generated through the first path; generating the temporarily stored reduced correction image as a rear output image when the output image is not effective; and delivering the rear output image to a display apparatus.

The rear view camera image processing method may further include, before the processing through each of the first path and the second path, converting to an operation ready state when a setting signal is input from the outside, and the setting signal may include an operation clock, and a horizontal sync signal and a vertical sync signal of an image.

The processing through each of the first path and the second path may include, through the first path, image signal-processing the original rear image to generate a rear image, correcting a distortion phenomenon of the rear image and generating the rear image as a distortion correction image, and storing the distortion correction image in a memory, and generating the stored distortion correction image as the output image displayable by the display apparatus.

The processing through each of the first path and the second path may include, through the second path, reducing a resolution of the rear image and generating the reduced rear image.

The generating as the rear output image may include correcting the distortion phenomenon of the reduced rear image and generating the rear image as the reduced correction image when an operation control signal is input, and recovering the resolution of the reduced correction image to the resolution of the rear image, and generating the rear image as the rear output image.

Advantageous Effects

According to exemplary embodiments of the present disclosure, even though components installed in a non-safety area cause a malfunction, a rear view camera image can be processed in a safety area, so image distortion of the rear view camera may be safely corrected and provided to a driver.

Further, a resolution of an image is controlled and provided, so it is possible to implement a memory for a dewarp function to the safety area without influencing an entire chip size.

MODE FOR INVENTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

Hereinafter, with reference to drawings, an apparatus and a method for rear view camera image distortion correction according to exemplary embodiments of the present disclosure will be described. Prior to describing an exemplary embodiment of the present disclosure, an example of providing an image collected by a general rear view camera is first described with reference to FIGS. 1A and 1B.

Figure 1A:
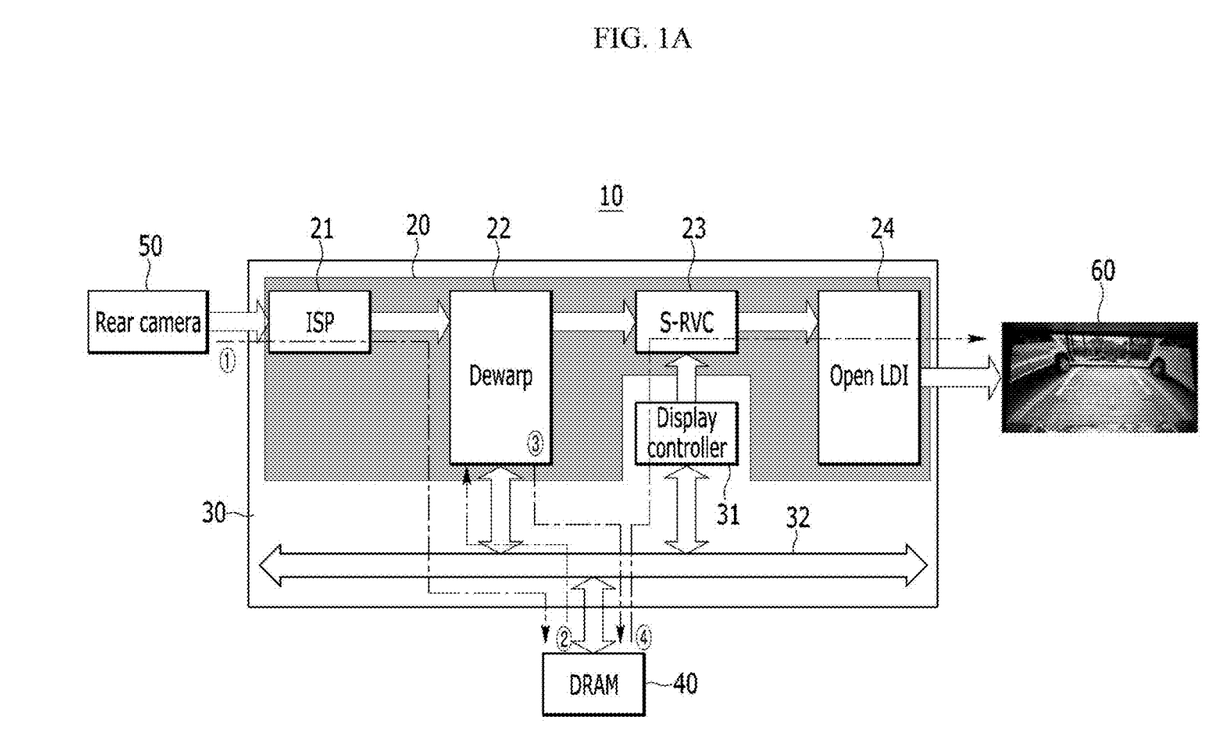
FIGS. 1A and 1B are exemplary diagrams of generally providing an image collected by a rear view camera.
Figure 1B:
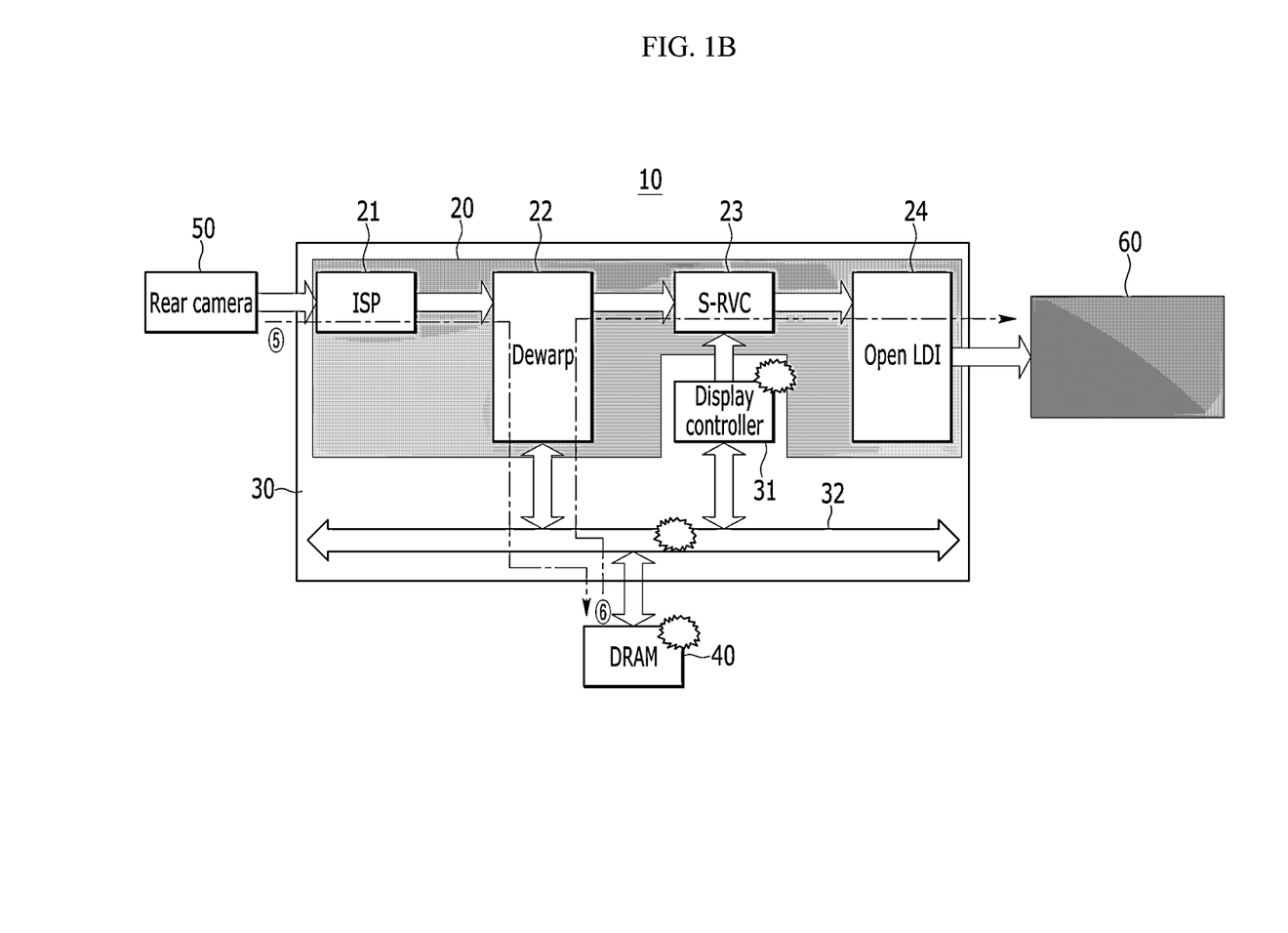

FIGS. 1A and 1B are exemplary diagrams of generally providing an image collected by a rear view camera.

In a general situation, a path of processing an image collected by a rear view camera 50 of an automobile is illustrated in FIG. 1A. In this case, in an image processing apparatus 10, an ISP 21, a dewarp 22, an S-RVC 23, an open LDI 24, and a display controller 31 are connected through a bus 25. In addition, the image processing apparatus 10 may be connected to a DRAM 40 through the main bus 32.

The ISP 21 performs a function of processing and processing the image collected by the rear view camera 50. That is, the ISP 21 receives images acquired by image sensors (CCD and CIS) of the rear view camera 50, basically processes a luminance and a color, and also additionally performs functions such as focus, inversion, mosaic, CMOS image sensor, an image format, etc. The function of the ISP 21 is already known, and in an exemplary embodiment, a detailed description is omitted.

The dewarp 22 corrects a distortion phenomenon of the image processed by the ISP 21. In order for the dewarp 22 to correct the distortion phenomenon in the image, set values of distortion correction parameters are required, and the set values may be calculated by the ISP 21. In this case, the dewarp 22 calls the image stored in the DRAM 40 several times to correct the distortion phenomenon. The function of correcting the distortion phenomenon by the dewarp 22 is already known, and in an exemplary embodiment, the detailed description is omitted.

The S-RVC 23 basically receives an image signal transmitted by a display controller 31, and performs addition image processing such as drawing a parking line in the received image signal or adding a warning message to the image signal. Here, the image signal is an image signal converted by the display controller 31 so that the image of which the distortion phenomenon is corrected is received by the open LDI 24 and displayed in a display apparatus 50.

Further, when an error occurs in the display controller 31, the S-RVC 23 receives the image of which the distortion phenomenon is corrected by the dewarp 22, and performs addition image processing, and transmits the image to the open LDI 24.

The open LDI 24 as a universal digital video interface standard for high-speed data transmission increases a bit speed, lowers power, and provides enhanced noise control performance. The image subjected to the addition image processing or the image of which the distortion phenomenon is corrected is transmitted to the display apparatus 50 according to the control of the open LDI 24. Here, the function of the open LDI 24 is already known, and in an exemplary embodiment, the detailed description is omitted.

Here, since the safety mechanism is applied to the IPS 21, the dewarp 22, the S-RVC 23, and the open LDI 24, an area including the components is referred to as the safety area 20. In addition, since the safety mechanism is not applied to the display controller 31 and the main bus 32, an area including two components is referred to as a non-safety area 30.

As illustrated in FIG. 1A, in the general situation, the image collected by the rear view camera 50 is stored in the DRAM 40 via the ISP 21, the dewarp 22, and the main bus 32. In this case, when a problem occurs in any one of the display controller 31, the main bus 32, or the DRAM 40 constituted in the non-safety area 30, a path in which the image is transmitted is changed differently from a path in which the image is transmitted in the general situation as illustrated in FIG. 1B.

As in an arrow direction (⑤, ⑥)), image data delivered by the rear view camera 50 is image-processed by the ISP 21 and changed to a YUV format. The image data of the changed YUV format is delivered to the dewarp 22 and the distortion of the image data is corrected.

In this case, the DRAM 40 implemented outside the image processing apparatus 10 stores all image data processed by the ISP 21 (⑤). The dewarp 22 corrects the distortion of the image by using the image data stored in the DRAM 40. The S-RVC 23 performs the addition image processing for the distortion-corrected image, and the display apparatus 60 outputs the image via the open LDI 24.

In this case, when a problem occurs in the DRAM 40 or the main bus 32, the dewarp 22 may not call the image stored in the DRAM 40 again, so the image collected by the rear view camera 50 may not be displayed through the display apparatus 60.

Therefore, an exemplary embodiment of the present disclosure proposes technology in which the display apparatus may safely display the image collected by the rear view camera 50 and provide the displayed image to the driver even though the error occurs in the components positioned in the non-safety area.

Figure 2:
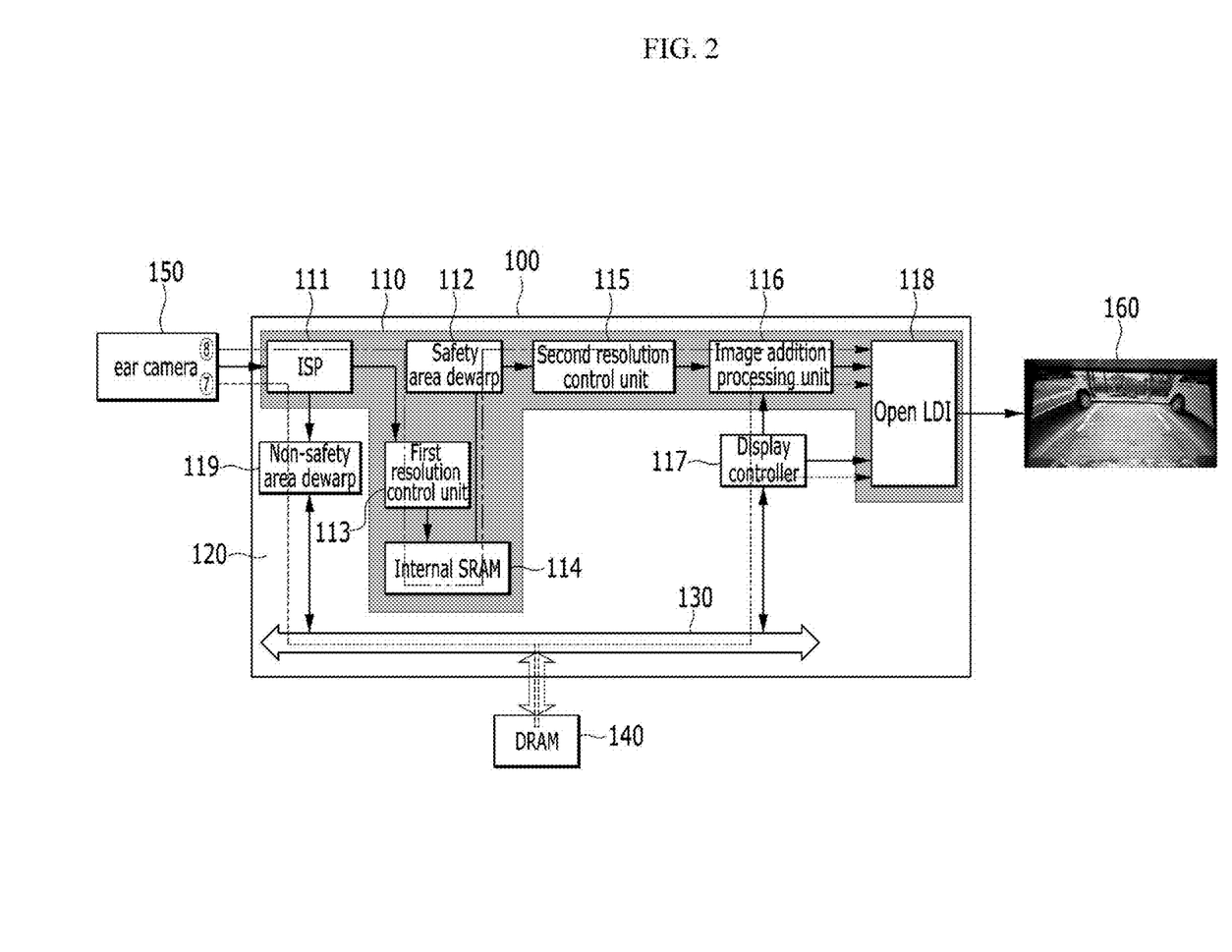
FIG. 2 is a structural diagram of a rear view camera image processing apparatus according to an exemplary embodiment of the present disclosure.

FIG. 2 is a structural diagram of a rear view camera image processing apparatus according to an exemplary embodiment of the present disclosure.

As illustrated in FIG. 2, the rear view camera image processing apparatus 100 that processes the image collected by the rear view camera 150 is implemented by components which are categorized into a safety mechanism reflection area (hereinafter, referred to as 'safety area' or 'first processing unit' for better comprehension and ease of description) 110 and a safety mechanism non-reflection area (hereinafter, referred to as 'non-safety area' or 'second processing unit' for better comprehension and ease of description) 120, and process rear view camera collection images.

An IPS 111, a safety area dewarp 112, a first resolution control unit 113, an internal SRAM 114, a second resolution control unit 115, an image addition processing unit 116, and an open LDI 118 are positioned in the safety area 110.

Meanwhile, a non-safety area dewarp 119, the main bus 130, and the DRAM 140 are implemented in the non-safety area 120.

The rear view camera image processing apparatus 100 also interlocks with the rear view camera 150 and the display apparatus 160. The rear view camera image processing apparatus 100 is implemented as one chip, and in an exemplary embodiment of the present disclosure, the rear view camera image processing apparatus 100 is not limited to any one of implemented chip forms.

A rear image collected by the rear view camera 150 is processed simultaneously through two paths in the rear view camera image processing apparatus 100. However, the image processed in any one of two paths is displayed through the display apparatus 160.

Here, two paths may be defined as a normal path (⑦) and an emergency path (⑧). The normal path is a path that processes the rear image through components implemented in the non-safety area and some components implemented in the safety area. The emergency path is a path that processes the rear image only by the components implemented in the safety area by malfunctions of the components implemented in the non-safety area.

For better comprehension and ease of description, first, a component when the image is delivered through the normal path is first described, and the component when the image is delivered through the emergency path is subsequently described. However, actually, the image is simultaneously delivered through the normal path and the emergency path.

When the ISP 111 receives original rear images acquired by the image sensors (CCD and CIS) of the rear view camera 150, the ISP 111 performs general image processing functions such as luminance, color, focus, inversion, etc., of the rear image to generate the rear images. The function of the ISP 111 is already known, and in an exemplary embodiment, the detailed description is omitted.

The rear image generated by the ISP 111 is delivered to the non-safety area dewarp 119. The non-safety area dewarp 119 corrects the distortion phenomenon of the rear image processed by the ISP 111 to generate the distortion correction image. Set values of the distortion correction parameters are required for the non-safety area dewarp 119 to correct the distortion phenomenon in the image, and the set values may be calculated by the ISP 111. As already known technology, the detailed description is omitted in an exemplary embodiment.

The distortion correction image generated by the non-safety area dewarp 119 is stored in the DRAM 140 through the main bus 130. In an exemplary embodiment, it is described that the distortion phenomenon is corrected once by the non-safety area dewarp 119, and the distortion correction image is stored in the DRAM 140, but the distortion correction image stored in the DRAM 140 is read by the non-safety area dewarp 119, which may also repeatedly correct the distortion phenomenon.

The display controller 117 reads the distortion correction image stored in the DRAM 140, and converts the distortion correction image into a form which may be processed by the open LDI 118, and generates the converted form as an output image. In addition, the display controller 117 generates image information including the output image and vertical/horizontal sync information for the output image. A method in which the display controller 117 processes the distortion correction image and generates the processed distortion correction image as the output image, and a method in which the display controller 117 obtains the vertical and horizontal sync information for the output image are already known technology, and in an exemplary embodiment of the present disclosure, the detailed description is omitted.

The display controller 117 delivers the image information to the image addition processing unit 116 or the open LDI 118 based on vehicle state information transmitted by a main processor (not illustrated) of the vehicle. Here, the vehicle state information includes information indicating whether the vehicle is currently driven or state information of a gear manipulated by the driver for parking, and since a method in which the display controller 117 collects the vehicle state information may be variously executed, the method is not limited to any one method in an exemplary embodiment of the present disclosure.

When the vehicle state information indicates a driving state, the display controller 117 delivers the image information to the open LDI 118. However, when the vehicle state information indicates a case where the gear is changed in order to try parking, the display controller 117 delivers the image information to the image addition processing unit 116 in order to provide an addition image such as the parking line or a notification message to the output image.

The open LDI 116 receives the output image from the image addition processing unit 116 or the display controller 117, and delivers the output image to the display apparatus 160. The open LDI 116 as a universal interface standard for high-speed data transmission increases a bit speed of the output image, lowers power, and provides enhanced noise control performance.

Meanwhile, when components are described according to an order in which the rear images are delivered through the emergency path, the first resolution control unit 113 receives the rear image generated by the ISP 111, and controls an image resolution, and generates the rear image as a reduced rear image. In an exemplary embodiment of the present disclosure, it is described as an example that the resolution of the rear image is 2048×1440, and it is described as an example that the first resolution control unit 113 reduces the resolution of the rear image to ¼ and generates the rear image with a resolution of 512×360.

In this case, the first resolution control unit 113 may also control the resolution by receiving the distortion correction image of which the distortion phenomenon is corrected by the safety area dewarp 112. In an exemplary embodiment of the present disclosure, for better compression and ease of description, it is described as an example that the ISP 111 controls the resolution without correcting the distortion phenomenon in the rear image generated by the ISP 111, but the present disclosure is not particularly limited thereto.

The internal SRAM 114 stores the reduced rear image generated by the first resolution control unit 113. The internal SRAM 114 may also judge the effectiveness of the reduced rear image storing the ECC function as the error correction code in addition to a function of storing the reduced rear image. The ECC function is already known, and in an exemplary embodiment, the detailed description is omitted. Further, it is described as an example that the internal SRAM 114 performs the ECC function, but the present disclosure is not particularly, limited thereto.

When the safety area dewarp 112 receives an operation control signal from the image addition processing unit 116, the safety area dewarp 112 reads the reduced rear image stored in the internal SRAM 114, and corrects the distortion phenomenon, and then generates a reduced correction image. As another exemplary embodiment, the safety area dewarp 112 may correct the distortion phenomenon in the rear image generated by the ISP 111, and then also deliver the corrected rear image to the first resolution control unit 113.

The second resolution control unit 115 receives the reduced correction image generated by the safety area dewarp 112, and recover the reduced resolution to the resolution of the rear image to generate the output rear image. Since a method in which the second resolution control unit 115 recovers the resolution of the reduced image is already known, the detailed description is omitted in an exemplary embodiment of the present disclosure.

The second resolution control unit 115 may also additionally generate the image information for the output rear image. The image information may include the output rear image and the vertical/horizontal sync information for the output rear image.

When the image addition processing unit 116 receives the output image from the display controller 117 or receives the output rear image from the second resolution control unit 115, the image addition processing unit 116 performs an image processing procedure for providing additional information, such as adding the parking line to each image or adding the warning message to the image. Since a method in which the image addition processing unit 116 processes the image in order to provide the additional information to the image may be executed by various methods, the method is not limited to any one method in an exemplary embodiment of the present disclosure.

Further, the image addition processing unit 116 confirms the effectiveness of the output image based on the image information included in each output image. In order to confirm the effectiveness from the output image, the image addition processing unit 116 receives a setting signal from a control device (not illustrated) that controls electric devices of the vehicle.

Here, the setting signal includes an operation clock of the image addition processing unit 116, and a horizontal sync signal and a vertical sync signal for the image, and when the rear view camera image processing apparatus 100 is executed by starting the vehicle, the rear view camera image processing apparatus 100 receives the setting signal from the control device. Here, the operation clock as a reference clock used for judging the effectiveness of the sync signal means a 24 MHz XIN clock in an exemplary embodiment. The image addition processing unit 116 judges the effectiveness of the output image based on the setting signal.

That is, when the image addition processing unit 116 receives the output image and the image information, the image addition processing unit 116 judges whether the output image is input as large as the setting value by comparing the clock, the horizontal sync information, and the vertical sync information included in the image information with a pre-received setting signal. In addition, by confirming whether only a stopped image is continuously input, whether an image having a single color is input, whether different image information from the setting signal is input, etc., it is confirmed whether the error occurs in the components installed in the non-safety area.

When it is judged that there is the error, the image addition processing unit 116 tries to switch a path of receiving the image from the normal path to the emergency path. In addition, in order to receive the image of which resolution is controlled by the second resolution control unit 115, the operation control signal is transmitted to the safety area dewarp 112. Through this, even though the error occurs in the DRAM 140, the main bus 130, etc., which are implemented in the non-safety area, the rear view camera image stored in the internal SRAM 114 may be delivered to the display apparatus 160.

A method in which the rear view camera image processing apparatus 100 described above processes the image of the rear view camera will be described with reference to FIG. 3.

Figure 3:
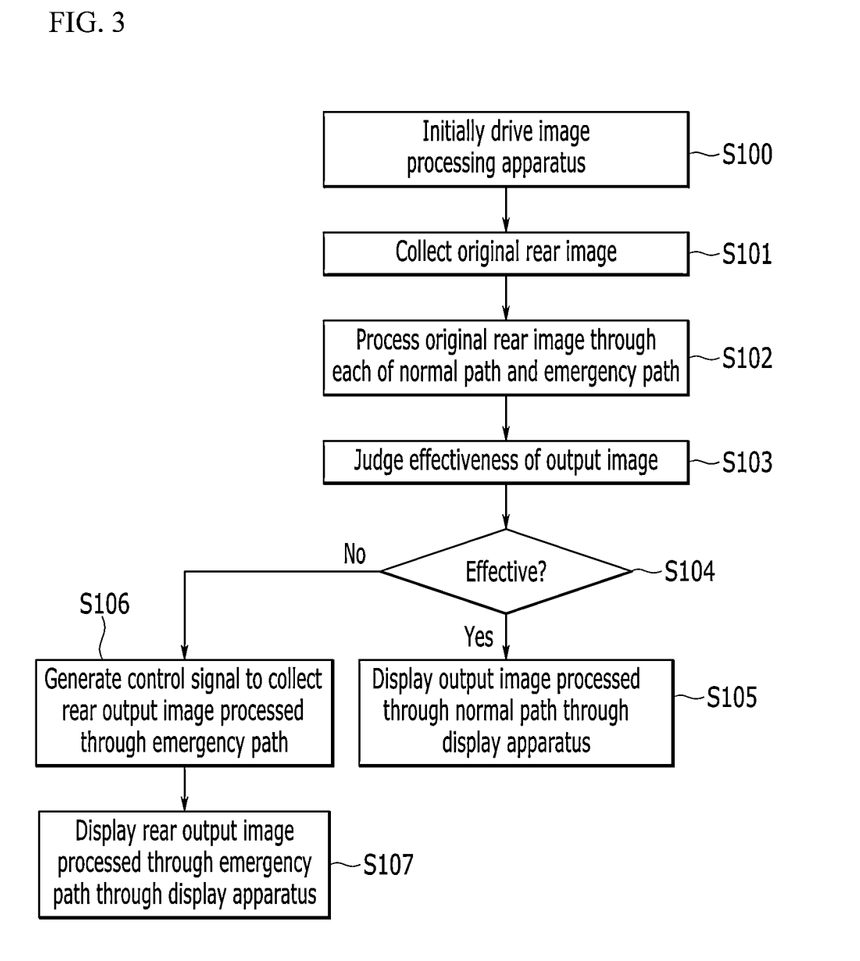
FIG. 3 is a flowchart for a rear view camera image processing method according to an exemplary embodiment of the present disclosure.

FIG. 3 is a flowchart for a rear view camera image processing method according to an exemplary embodiment of the present disclosure.

As illustrated in FIG. 3, the rear view camera image processing apparatus 100 is initially driven (S100). In this case, all components constituting the rear view camera image processing apparatus 100 are changed to an operation ready state, and in particular, the image addition processing unit 116 receives the setting signal from the control device. Further, the image addition processing unit 116 is first set to a ready state of receiving the image through the normal path.

When the rear view camera 150 collects the image (S101), the original rear images collected through the normal path and the emergency path are transmitted, and the images are respectively processed (S102). In this case, the rear view camera image processing apparatus 100 is set so that the output image processed through the normal path is first provided.

Therefore, the image addition processing unit 116 of the rear view camera image processing apparatus 100 judges the effectiveness of the output image generated through the normal path (S103). The image addition processing unit 116 confirms whether the output image is effective based on the image information included in the output image, and the setting signal received from the control device upon initial driving in step S100 (S104).

When it is confirmed that the output image is effective, the rear view camera image processing apparatus 100 displays the output image processed through the normal path through the display apparatus 160 (S105).

On the contrary, when it is confirmed that the output image is not effective, the image addition processing unit 116 of the rear view camera image processing apparatus 100 generates the control signal in order to receive the rear output image processed through the emergency path (S106). The second resolution control unit 115 generates the reduced rear image stored in the internal SRAM 114 as the output rear image according to the control signal, and displays the generated output rear image through the display apparatus 160 (S107).

Figure 4:
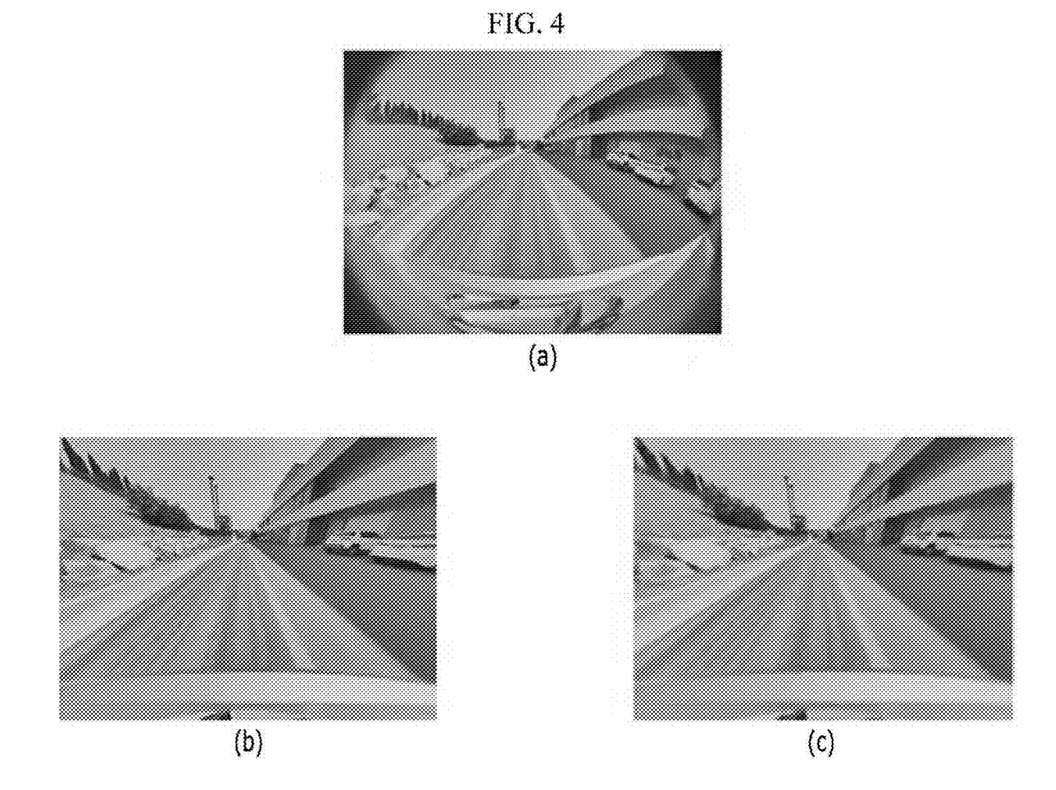
FIG. 4 is an exemplary diagram of a rear view camera image in which distortion is corrected provided according to an exemplary embodiment of the present disclosure.

FIG. 4 is an exemplary diagram of a rear view camera image in which distortion is corrected provided according to an exemplary embodiment of the present disclosure.

FIG. 4A illustrates the original rear image collected by the rear view camera 150. In addition, FIG. 4B illustrates the output image processed through the normal path. FIG. 4C illustrates the rear output image processed through the emergency path.

With respect to the rear output image processed through the emergency path in FIG. 4C as compared with the output image processed through the normal path in FIG. 4B, image quality deterioration may occur according to resolution reduction/extension. However, even though the problem occurs in the components implemented in the non-safety area of the rear image processing system 100, the driver may normally confirm the operation of the rear view camera 150.

While the exemplary embodiments of the present disclosure have been described above in detail, it is to be understood that the scope of the present disclosure is not limited to the disclosed exemplary embodiments, but, on the contrary, is intended to cover various modifications and equivalent arrangements included within the spirit and scope of the appended claims.

The invention claimed is:

1. A rear view camera image processing apparatus comprising:
an image signal processor that generates a rear image based on an original rear image collected by a rear view camera;
a first processing unit that corrects a distortion phenomenon of the rear image to generate a distortion correction image, and generates as an output image displayable through a display apparatus;
a second processing unit that reduces a resolution of the rear image generated based on the original real image to generate a reduced rear image and temporarily stores the reduced rear image, and upon receiving an operation control signal, corrects the distortion phenomenon of the temporarily stored reduced rear image, and then recovers the resolution of the temporarily stored reduced rear image, and generates an output rear image; and
an image addition processing unit that delivers the output image generated by the first processing unit to the display apparatus, and confirms an effectiveness of a sync signal of the output image based on a setting signal transmitted from a control device upon an initial operation of the rear view camera, and generates the operation control signal so as for the second processing unit to operate when the output image is not effective,
wherein the first processing unit includes:
a non-safety area dewarp that corrects the distortion phenomenon of the rear image and generates the distortion correction image,
a memory to stores the distortion correction image, and
a display controller receiving the distortion correction image stored in the memory, and converting the received distortion correction image into the output image displayable through the display apparatus.

2. The rear view camera image processing apparatus of claim 1, wherein:
the first processing unit further includes, an open LDI receives any one image of the output image or the output rear image from the image addition processing unit, and delivers the received image to the display apparatus.

3. The rear view camera image processing apparatus of claim 1, wherein:
the display controller,
transmits the output image to any one of the image addition processing unit or the open LDI based on a vehicle state information transmitted by a main processor of a vehicle.

4. The rear view camera image processing apparatus of claim 3, wherein:
the second processing unit includes
a first resolution control unit receiving the rear image, and reducing the resolution of the rear image and generating the rear image as the reduced rear image,
an internal memory temporarily storing the reduced rear image,
a safety area dewarp receiving the reduced rear image temporarily stored in the
internal memory and correcting the distortion phenomenon, and generating the reduced correction image when receiving the operation control signal, and a second resolution control unit recovering the resolution of the reduced correction image to the resolution of the rear image, and generating the rear image as the output rear image.

5. The rear view camera image processing apparatus of claim 4, wherein:
the image addition processing unit
receives the output image and image information from the first processing unit, and compares the setting signal and the image information to confirm the effectiveness of the sync signal of the output image.

6. The rear view camera image processing apparatus of claim 5, wherein:
the setting signal includes an operation clock, and a horizontal sync signal and a vertical sync signal of an image, and the image information includes horizontal sync information and vertical sync information of the output image.

7. A rear view camera image processing method for processing, by a rear view camera image processing apparatus operated by at least one processor, an original rear image collected by a rear view camera, the method comprising:
processing the original rear image through each of a first path and a second path when the rear view camera collects the original rear image;
delivering an output image generated through the first path to a display apparatus, and temporarily storing a reduced correction image generated through the second path;
confirming an effectiveness of a sync signal of the output image generated through the first path based on a setting signal transmitted from a control device;
generating the temporarily stored reduced correction image as a rear output image when the output image is not effective;
delivering the rear output image to a display apparatus; and
before the processing through each of the first path and the second path, converting to an operation ready state when the setting signal is input from the control device,
wherein the setting signal includes an operation clock, and a horizontal sync signal and a vertical sync signal of the image.

8. The rear view camera image processing method of claim 7, wherein:
the processing through each of the first path and the second path includes through the first path,
image signal-processing the original rear image to generate a rear image, correcting a distortion phenomenon of the rear image and generating the rear image as a distortion correction image, and
storing the distortion correction image in a memory, and generating the stored distortion correction image as the output image displayable by the display apparatus.

9. The rear view camera image processing method of claim 8, wherein:
the processing through each of the first path and the second path includes through the second path,
reducing a resolution of the rear image and generating the reduced rear image.

10. The rear view camera image processing method of claim 9, wherein:
the generating as the rear output image includes
correcting the distortion phenomenon of the reduced rear image and generating the rear image as the reduced correction image when the operation control signal is input, and
recovering the resolution of the reduced correction image to the resolution of the rear image, and generating the rear image as the rear output image.

* * * * *